March 22, 1932.  G. L. R. J. MESSIER  1,850,724
DEVICE FOR BRAKING AIRPLANES UPON LANDING
Filed July 6, 1929  2 Sheets-Sheet 1
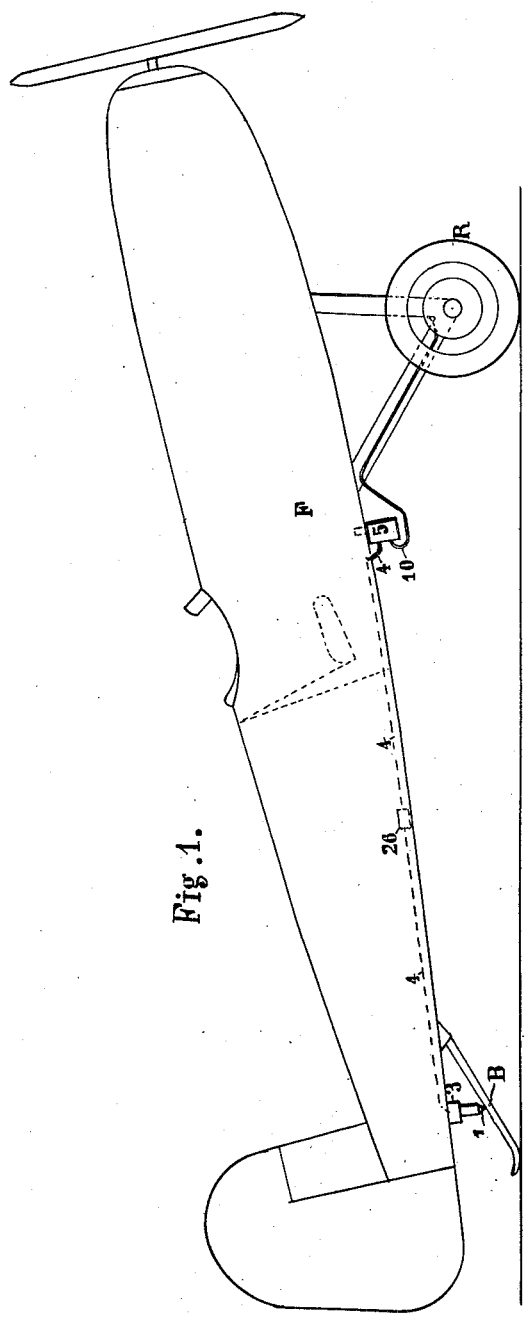
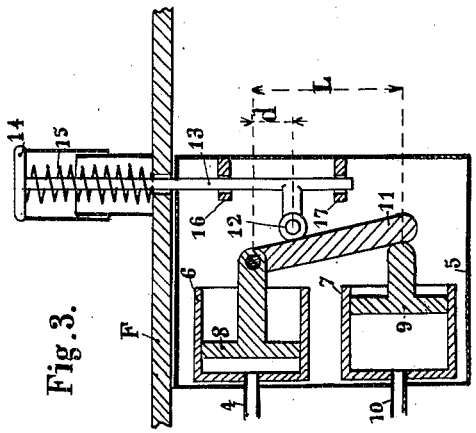
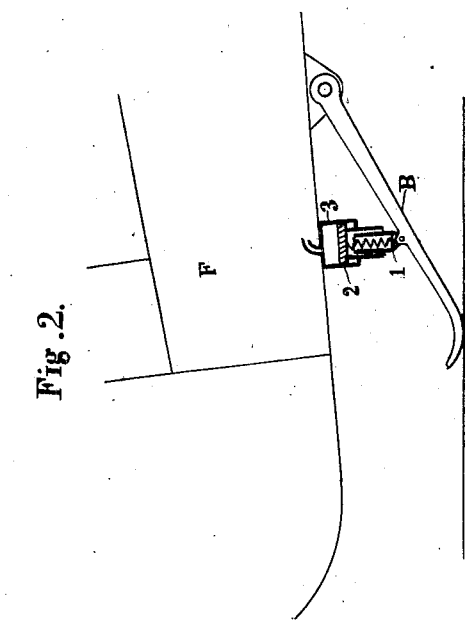
INVENTOR
George Louis René Jean Messier
by *Attorney*

March 22, 1932. G. L. R. J. MESSIER 1,850,724
DEVICE FOR BRAKING AIRPLANES UPON LANDING
Filed July 6, 1929 2 Sheets-Sheet 2
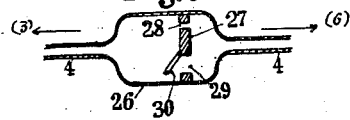
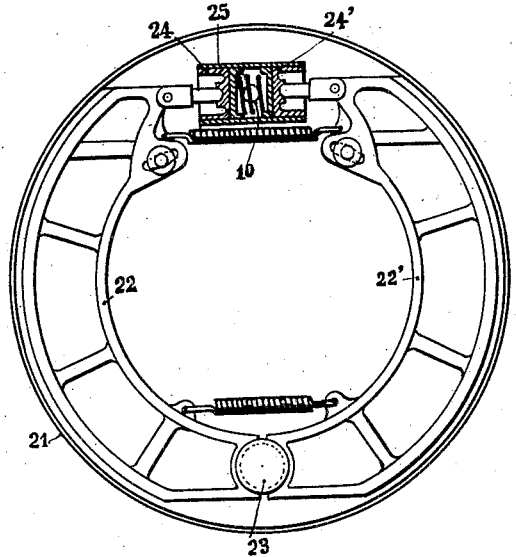
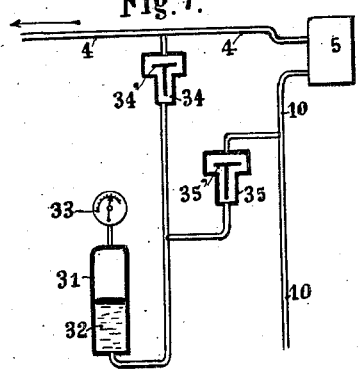
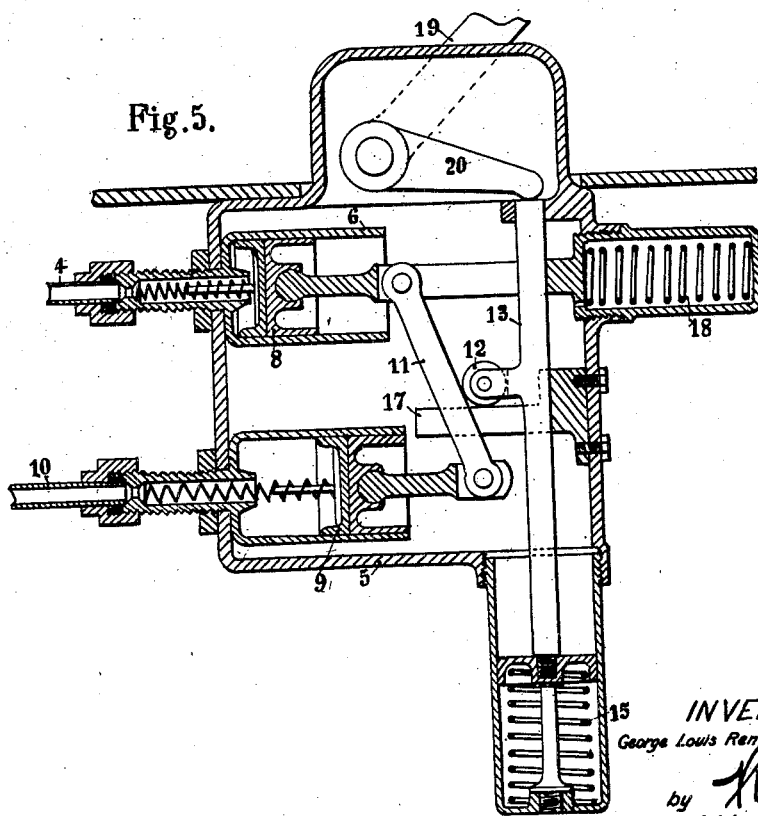
INVENTOR
George Louis René Jean Messier
by
Attorney Patented Mar. 22, 1932

1,850,724

UNITED STATES PATENT OFFICE

GEORGE LOUIS RENÉ JEAN MESSIER, OF MONTROUGE, FRANCE

DEVICE FOR BRAKING AIRPLANES UPON LANDING

Application filed July 6, 1929, Serial No. 376,362, and in France July 7, 1928.

When an airplane lands, its speed first decreases somewhat rapidly owing to the resistance exerted by the air on its planes. However, this resistance diminishing very rapidly as the speed of the airplane slows down, the distance travelled over before final stoppage may be considerable.

It would be often of extreme interest to reduce this long landing distance; particularly in case of compulsory landing on a ground of small area, efficient brakes might often avoid an accident.

The problem of braking the wheels of an airplane is, however, very delicate and this braking must be effected with great caution, owing to the high position of the center of gravity and of the risks of turning over which may arise from this high position if the braking is too powerful. For these reasons, the application of brakes of any system to the wheels of an airplane, brakes controlled by the pilot, is not without serious inconveniences. On the other hand, the apprehension of the accident may prevent the pilot from utilizing his brakes with all the desirable opportunity.

Furthermore, the braking of the wheels of a heavy airplane involves another difficulty resulting from the fact that the use of ordinary brakes would require from the pilot a considerable, if not impossible, effort, or would necessitate the use of auxiliary brake-actuating devices which, by their variable efficiency, would further increase the risks.

The applicant has devised a system ensuring a powerful braking, and giving at the same time an absolute security upon landing.

It is to be noted that the airplane, when it has come in contact with the ground, is in security as long as a sufficient portion of its weight bears upon the tail skid. The danger of turning over begins only when this condition is no longer fulfilled. The present invention utilizes, for effecting the application of the brakes on the wheels of airplanes, the reaction of the ground on the tail skid.

The relation between the application of the brakes and this reaction must comply to various conditions some of which are imperative. These conditions, hereinafter set forth, are fulfilled by the devices designed by the applicant and which will be described later on.

1. The braking must be exerted only as long as the pressure of the tail skid on the ground does not fall below a predetermined value.

2. Beyond this value, the intensity of the braking must be proportional to the reaction of the ground on the tail skid, the coefficient of proportionality being chosen at every instant by the pilot owing to a special control means.

3. The control, by the pilot, must be individual for each wheel, this ensuring the ease of steering on the gound when the rubber no longer acts.

4. The control, through the tail skid, must be provided with a retarding device, acting for preventing, in any case, even in the case of an untimely manœuvre of the pilot, the too sudden application, whilst allowing the release to take place instantaneously when the pressure of the tail skid on the ground falls below a predetermined value.

For carrying out a semi-automatic braking system answering to these conditions, it is possible to provide either mechanical connections, or hydraulic transmission between the tail skid and the brakes.

The present invention particularly relates to a method for carrying out such a system utilizing hydraulic transmissions.

This system substantially comprises:

(a) A pump barrel connected to the tail skid, so as to send or deliver in a piping a liquid under a pressure which is proportional to the reaction of the ground on the tail skid.

(b) On each wheel, a brake drum the cheeks or segments of which are controlled by one or two pistons moving in a cylinder in which can be sent a liquid under pressure, the displacement of these pistons having then for effect to apply the said cheeks or segments against the said drum.

(c) For each wheel, a regulating device, controlled by the pilot, this device receiving the liquid under pressure from the pump barrel of the tail skid and sending, in its turn, into the brake cylinder, a liquid under pressure.

An essential feature of the invention resides in the fact that this regulating device is combined in such a manner that the pressure of the liquid delivered towards the brake cylinder is proportional to the pressure of the liquid coming from the pump barrel of the tail skid, the coefficient of proportionality being variable, at the pilot's will, from zero up to a maximum value.

(d) On the piping, in the vicinity of the outlet of the pump barrel of the tail skid, a retarding member limiting the speed of flow of the liquid delivered towards the regulators; this member being so arranged as to allow the free return of the liquid and, consequently, an instantaneous release of the brakes.

Such a system of braking of the wheels of airplanes is diagrammatically illustrated in the accompanying drawings in which:

Fig. 1 is a side elevation of the fuselage and landing gear of an airplane provided with the present device.

Fig. 2 illustrates, on an enlarged scale, the tail skid with its pump barrel.

Fig. 3 shows the regulating device.

Fig. 4 illustrates the braking device of a wheel with its brake drum and the pump barrel.

Fig. 5 is a section of a form of construction of the regulator.

Fig. 6 diagrammatically illustrates the retarding device.

Fig. 7 shows a safety device.

In these figures, F designates the fuselage of the airplane, R the wheels, B the tail skid.

The resilient member 1 attached to the tail skid, instead of directly bearing on the fuselage, is connected to the piston 2 of a pump barrel 3 and transmits to this piston the reaction of the tail skid B, when the latter presses on the ground.

A piping 4 causes the pump barrel 3 to communicate with the regulating devices. Each of these latter essentially comprises a casing 5 (made of aluminium for instance), in which are arranged two cylinders 6 and 7. In these cylinders move two pistons 8 and 9, respectively.

The cylinder 6 communicates, through the piping 4, with the pump barrel 3 of the tail skid. This piping 4 is provided with a branch leading to the second regulator. A piping 10 causes the cylinder 7 of each of the regulators to communicate with the brake cylinder of the corresponding wheel.

The pistons 8 and 9 are connected by a beam 11 bearing on a roller 12 rigid with a rod 13 (Fig. 3). This rod carries at its upper part, a pedal 14, on which the pilot can press, a spring 15 constantly acting for causing the rod 13 to rise.

Two abutments 16 and 17 limit the displacement of the rod and, consequently, the movement of the roller 12. The function of the regulator is to allow of varying, from zero up to a maximum value, the value of the ratio between the pressure in the piping 10 and the pressure in the piping 4, that is to say the value of the ratio between the intensity of the braking and the intensity of the reaction of the ground on the tail skid.

The beam and the roller, combined for that purpose, constitute in fact, a lever the arms of which are of variable length.

Designating by:
S the section of the cylinders 6 and 7,
P the pressure per square centimeter of the liquid in the cylinder 6,
P' the pressure per square centimeter of the liquid in the cylinder 7,
F the total pressure exerted by the liquid on the piston 8,
F' the total pressure exerted by the liquid on the piston 9,
d the distance, which is variable, from the axis of the roller 12 to the axis of the piston 8,
L the distance, which is constant, separating the axes of the cylinders 6 and 7, it can be stated that:

$$\frac{F'}{F} = \frac{d}{L-d} \text{ whereby } \frac{P' \times S}{P \times S} = \frac{d}{L-d} \text{ and}$$

$$\frac{P'}{P} = \frac{d}{L-d}$$

It will be understood that, for a given value of P, corresponding to a definite intensity of the reaction of the ground on the tail skid, P' varies in the same direction as P, starting from the value zero, when the distance $d$ is null.

The relation $$\frac{P'}{P} = \frac{d}{L-d}$$

shows that P' can take a very high value if $d$ tends to become equal to L, that is to say if the roller 12 moves down on the lever 11, to a point adjacent to the axis of the piston 9. For preventing P' from reaching too high values, the abutment 17 has been provided, this abutment preventing the roller 12 from moving down below a predetermined extreme position.

Fig. 5 shows a form of construction of the regulator, based on the same principle.

All the essential parts which have been described with reference to Fig. 3 are to be found in this figure. The piston 8 is constantly pushed back by a spring 18.

The actuation is effected through a pedal (not shown), the stem 19 of which moves a lever 20 which acts on the end of the rod 13. The roller 12 might be replaced by a cam, of suitable profile, and the rotation of which would be controlled by the pilot.

Each wheel of the airplane carries a brake drum 21 provided with brake cheeks or segments 22, 22', the spacing apart of which, about the pivot member 23, is controlled by pistons 24, 24' moving in a common cylinder 25. In this cylinder opens the piping 10 extending from the regulating device corresponding to the brake drum under consideration. It will be easily understood that the delivery of the liquid, contained in the piping 10, by the piston 9, has for effect to space apart both pistons 24, 24' and, consequently, to apply the cheeks or segments 22, 22' on the brake drum 21.

As already stated, a retarding device is interposed on the piping 4 extending from the pump barrel of the tail skid. This retarding device, diagrammatically illustrated at 26 in Fig. 1, is composed (Fig. 6) of a small chamber, within which is mounted a diaphragm 27, perforated with two orifices. One of these orifices 28, is unobstructed and of small dimension; the other, 29, is provided with a valve 30 which can open on the side of the tail skid. When the latter, pushing back the piston 2, drives the liquid towards the regulators, this liquid can pass through the retarding device only through the small orifice 28. It therefore flows away slowly. On the contrary, the flow of the liquid in the reverse direction, that is to say from the regulators towards the pump barrel of the tail skid (release of the brakes), rapidly takes place by opening of the valve 29, 30.

Very simple accessory devices ensure always the complete filling up of all the piping and of all the cylinders before using the brakes, even if a loss occurs at some point.

A vessel 31 contains oil 32, above which exists a volume of air at a certain pressure, for instance under a pressure of 1 kilogram immediately controllable by a pressure gauge 33 arranged in view of the pilot. This vessel is connected to the pipings 4 (towards the tail skid) and 10 (towards the brakes) with interposition of small chambers 34 and 35, each enclosing a valve 34' and 35', allowing the oil under pressure to pass from the vessel 31 into the pipings 4 and 10, but preventing the reverse flow.

If slight leakage occurs at the brakes or at the pump barrels of the tail skid, the oil under pressure of the vessel 31 replaces the oil evacuated through leakage. Upon landing, as soon as the pressure in the pipings 4 and 10 exceeds that of the vessel 31, the valves 34' and 35' close again and this filling up device is put out of action.

If an important leakage occurs, the vessel 31 rapidly empties and the pilot is warned by the pressure gauge 33 that the brakes on the wheels can no longer be depended upon.

As liquid, use will preferably be made of an alcohol mixture which can support very low temperatures and still remain fluid. Special packings will be provided for ensuring the fluid-tightness of the various parts.

Having now particularly described my invention, what I claim is:—

1. Landing brakes using the reaction of the ground on the tail skid to effect the application of the brakes on the wheels of an airplane, comprising a piston actuated by said tail skid, a pump barrel containing said piston, fluid operated means on each wheel actuating said brakes and controlling or regulating means operated by the pilot comprising a cylinder connected to said pump barrel, a second cylinder connected to said fluid operated means, pistons in each cylinder, a beam engaging each piston and fulcrum means for said beam adapted to be adjusted by the pilot to positions on the axis of either piston in said regulating means and to intermediate positions so as to vary at the pilot's will the ratio of the fluid pressure in said pump barrel to the fluid pressure in said fluid operated means from zero up to a maximum compatible with the security of the landing.

2. Landing brakes using the reaction of the ground on the tail skid to effect the application of the brakes on the wheels of an airplane, comprising a piston actuated by said tail skid, a pump barrel containing said piston, fluid operated means on each wheel actuating said brakes and controlling or regulating means operated by the pilot comprising a cylinder connected to said pump barrel, a second cylinder connected to said fluid operated means, pistons in each cylinder, a beam engaging each piston, a roller engaging said beam, a rod rotatably supporting said roller and adapted to be adjusted by the pilot to vary the relative displacement between said pistons in the regulating means from zero up to a maximum compatible with the security of the landing.

3. A braking system for an airplane having a tail skid, landing wheels and brakes therefor, said braking system utilizing the reaction of the ground upon the tail skid to effect the application of the brakes to the wheels of the airplane, including the combination, with a pump casing supported on said airplane and a reciprocable piston disposed within said casing and actuated by said tail skid, of a closed main fluid line connected to said casing, fluid-operated members associated with said brakes at each wheel, a second closed fluid line communicating with said fluid-operated members independently of said main fluid line, and mechanical means interconnecting and closing both of said fluid lines and operable at will to vary the amount of fluid pressure in both fluid lines between zero and the maximum limit pressure attainable therein.

4. Landing brakes using the reaction of the ground on the tail skid to effect the application of the brakes on the wheels of an airplane, comprising a piston actuated by said tail skid, a pump barrel containing said piston, fluid operated means on each wheel actuating said brakes and control means operable by the pilot and connected between said pump barrel and said fluid operated means for varying at the pilot's will the ratio of the fluid pressure in said pump barrel to the fluid pressure in said fluid operated means from zero up to a maximum compatible with the security of the landing, and a safety device connected between said pump barrel and said control means comprising a non-return valve combined with a scanty passage for the fluid so as to choke or retard the flow of the fluid from said pump barrel toward said regulating means while allowing a free return of the fluid to said pump barrel.

The foregoing specification of my "device for braking airplanes upon landing" signed by me this 21st day of June, 1929.

GEORGE LOUIS RENÉ JEAN MESSIER.